United States Patent [19]
Maurer et al.

[11] 3,907,307
[45] Sept. 23, 1975

[54] PACKING ASSEMBLY

[75] Inventors: William C. Maurer; Joe K. Heilhecker; Everett H. Lock, all of Houston, Tex.

[73] Assignee: Exxon Production Research Company, Houston, Tex.

[22] Filed: Nov. 1, 1972

[21] Appl. No.: 302,966

[52] U.S. Cl. .................... 277/69; 277/71; 277/124
[51] Int. Cl. ..................... F16j 15/18; F16j 15/40
[58] Field of Search ............. 277/59, 68, 69, 70–79, 277/3, 15, 124, 125

[56] References Cited
UNITED STATES PATENTS

| | | | |
|---|---|---|---|
| 580,049 | 4/1897 | Heim et al. | 277/68 |
| 2,509,162 | 5/1950 | Moses et al. | 277/68 |
| 2,673,103 | 3/1954 | Tremolada | 277/68 |
| 3,489,098 | 1/1970 | Roth et al. | 277/68 |

*Primary Examiner*—Robert I. Smith
*Attorney, Agent, or Firm*—Robert L. Graham

[57] ABSTRACT

An improved packing assembly for a reciprocating pump includes front and rear packings, an intermediate lubricating ring, and means for preventing the forward extrusion of the rear packing past the lubricating ring.

9 Claims, 3 Drawing Figures

PACKING ASSEMBLY

BACKGROUND OF THE INVENTION

1. Field of the Invention

This invention relates to dynamic packing. In one aspect, it relates to a packing assembly for high pressure reciprocating pumps.

2. Description of the Prior Art

A major problem associated with high pressure reciprocating pumps is that of providing a satisfactory seal between the plunger and the pump housing. In order to avoid excessive wear on the plunger and excessive friction, it is essential in most pumps to maintain a liquid film between the plunger and the packing. A lubrication system is generally employed for this purpose. In such systems a lubricating ring, frequently referred to as a lantern ring, is positioned between the packing elements and provides space for introducing a lubricant such as oil or grease into the packing assembly. The typical packing assembly which incorporates a lantern ring includes a first set of packing positioned in advance of the lantern ring and a second set of packing positioned to the rear of the lantern ring. The lubricant is normally introduced continually at a preset pressure into the lantern ring from an external source. During the power stroke of the plunger, the internal pump pressure acting axially on the packing assembly causes the rings to deform or deflect into sealing engagement with the plunger and its housing. The front set of packing rings provides the seal for the fluid being pumped while the rear set of packing initially provides a seal for the lubricant and, after the front packing fails, provides a seal for the fluid being pumped.

SUMMARY OF THE INVENTION

Extensive tests performed on the packing assembly of the type described above have revealed that the rear packing frequently fails before the front packing. These results are quite surprising because it has generally been believed that the front packing fails first. It is this packing that is subjected to high internal pressure and receives most of the wear. The rear packing initially is not exposed to the high fluid pressure and accordingly would be expected to last longer than the front packing. The tests referred to above revealed that the failure of the rear packing was primarily due to forward extrusion of the packing rings past the lantern ring. The forward extrusion of the rings was found to be detrimental to the operation of packing assembly in several respects. Excessive extrusion resulted in the premature leakage and loss of lubricant; it shortened the packing life of the assembly; and the extruded material tended to plug the lantern ring openings and lubricating passages.

The present invention substantially alleviates the extrusion problem described above by providing an improved packing assembly designed to prevent or at least reduce the tendency of the rear set of packing to extrude past the lantern ring. Briefly, the improved packing assembly comprises front and rear packings, a lubricating ring, e.g. lantern ring, interposed between the front and rear packings and means for preventing the extrusion of the rear packing past the lubricating ring.

In a preferred embodiment, the anti-extrusion means is provided by a backup ring designed to cooperate with the rear edge of the lantern ring. A pair of outwardly opening and rearwardly extending lip portions are formed in a rear edge portion of the lantern ring. The backup ring is adapted to mate with the rear edge of the lantern ring. The rear packing is disposed on the low pressure side of the backup ring. Thus during hydraulic loading of the packing assembly, the backup ring deforms forcing the lip portions of the lantern ring outwardly reducing the clearance gap between the lantern ring and the confining surfaces and preventing the forward extrusion of packing material.

DESCRIPTION OF THE PREFERRED EMBODIMENTS

The present invention will be described in connection with the plunger pump packing. It will be appreciated by those skilled in the art however that the invention can be applied in other types of high pressure packings.

Figure 1:
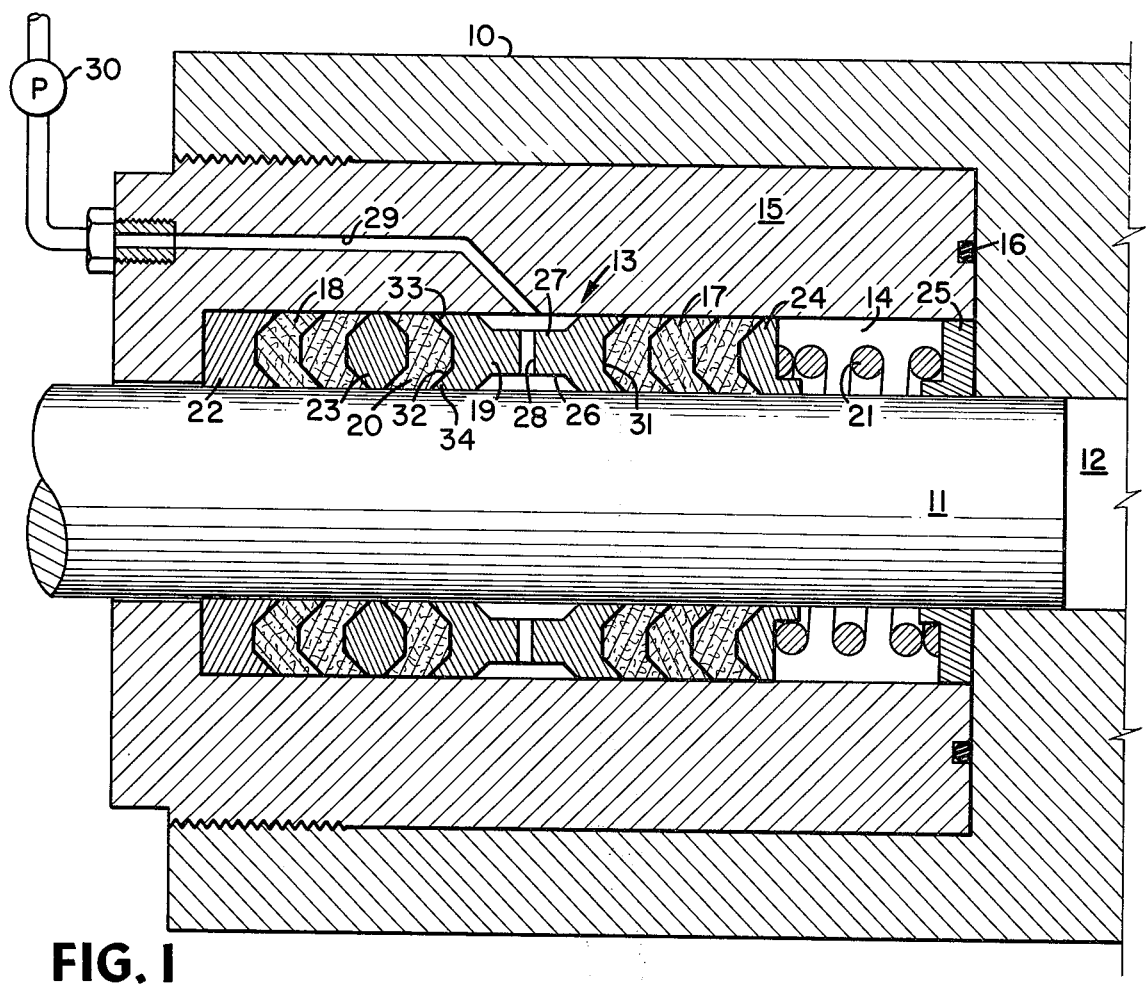
FIG. 1 illustrates in longitudinal section a portion of a plunger pump provided with the improved packing assembly of the present invention.

A plunger pump is illustrated in FIG. 1 as including a pump body 10 and a plunger 11 mounted for reciprocation within a bore 12 formed in the pump body 10. The packing for the plunger is provided by an assembly, illustrated as 13, mounted in an enlarged annular space 14 separating the plunger 11 and the pump body 10. In the preferred embodiment, the packing assembly 13 is shown mounted in a packing cartridge 15. A conventional stuffing box arrangement may also be employed for retaining the packing assembly 13 within the enlarged packing space 14. For purposes of this invention the packing cartridge 15 may be considered part of the pump body 10. The cartridge 15 is a generally cylindrical member adapted to be threadedly connected to the pump body 10 and is provided with a forward face seal 16 for sealing the interface between the cartridge 15 and the body 10.

The packing assembly 13 comprises a first set of packing rings 17 positioned in a forward section of annular space 14, a second set of packing rings 18 positioned in a rear section of annular space 14, a lantern ring 19 positioned behind the first set of packing 17, and a backup ring 20 interposed between the lantern ring 19 and the rear set of packing 18. A compression spring 21 may be employed to maintain the stackup of rings under compression. The assembly may also include adapter 22 positioned at the rear extremity of annular space 14, a male-to-male adapter 23 positioned between the backup ring 20 and the rear set of rings 18, and spring retainers 24 and 25. The terms used herein to denote direction are with reference to the high pressure side of the packing. Thus "front" or "forward" means toward the high pressure side of the packing and "rear" or "back" means away from the high pressure side of the packing or towards the low pressure side.

Adapters 22 and 23 may be composed of an elastomer, plastic, or a soft metal such as a bronze or copper alloy. Retainers 24 and 25 will normally be composed of a copper alloy or bronze alloy.

The packing rings 17 and 18 preferably are lip-type seal rings made of leather, rubber, fabric-reinforced rubber, plastic, and the like. These rings are pressure actuated, i.e. internal fluid pressure forces the seal lips into engagement with the confining surfaces. Although other types of seal rings may be employed, conventional V-rings have served particularly well in the packing of the present invention. As shown in FIG. 1, a set of three nested V-rings 17 comprises the front packing and a set of two nested V-rings 18 comprises the rear packing. The V-rings 17 and 18 are arranged within annular space 14 with their seal lips diverging forwardly. The inner lip of each V-ring engages the plunger 11 and the outer lip engages the interior of cartridge 15. The seal rings 17 and 18 are sized in relation to annular space 14 in accordance with established practices. During the pressure stroke of the plunger, the pressure within bore 12 creates a hydraulic loading on the front set of packing causing the lips of the V-rings 17 to deflect into pressure sealing engagement with the surfaces defining annular space 14. The hydraulic force is transmitted through the stackup of rings to the rear rings 18 which are also deformed on the power stroke of the plunger 11. On the return stroke of the plunger 11, the V-rings relax permitting lubricant to flow forwardly past the front packing rings 17 and provide a liquid film between the plunger 11 and rings 17.

The lantern ring 19 provides space intermediate the packing rings for introducing a lubricant. The lantern ring 19 may be conventional in the sense that it may be a rigid sleeve provided with internal and external grooves 26 and 27 interconnected by radial openings 28. It preferably is composed of a material harder than the packing rings 17 and 18 and the backup ring 20. Soft metals such as bronze alloys and copper alloys are suitable materials for the lantern ring 19. The lantern ring 19 registers with a passage 29 formed in the cartridge or body 10. Lubricant is fed into the passage 29 through pump 30. The front edge 31 of the lantern ring 19 is provided with a female adapter surface for mating with adjacent ring 17 of the front packing. In a preferred embodiment of the present invention, the rear edge of the lantern ring 19 defines a surface 32 adapted to cooperate with the backup ring 20. The rear edge surface 32 is thus defined by rearwardly and outwardly tapering lips 33 and 34, the angle of taper conforming generally to the taper of the backup ring 20. The backup ring 20 may be a conventional lip-type seal as illustrated. This ring however is positioned within annular space 14 in the reverse order; that is, the lips of ring 20 open rearwardly whereas the lips of the V-rings 17 and 18 open forwardly in the conventional arrangement. Thus it is seen the backup ring 20 may be the same as rings 17 and 18. In such an arrangement, a male adapter 23 is employed to conform the confronting female surfaces of rings 18 and 20.

Tests have shown that the packing arrangement illustrated in FIG. 1 and as described above effectively prevents the extrusion of rear packing rings 18. The lips 33 and 34 of ring 19 under loaded conditions are deflected outwardly providing a metal-to-metal seal on the surfaces defining annular space 14 and thus prevent the forward extrusion of backup ring 20 and rear rings 18. The backup ring 20 serves to transmit the loading which causes deflection of lips 33 and 34.

The following tests illustrate the effectiveness of the packing assembly in preventing the forward extrusion of the rear packing rings. Several tests were performed on a 1000 horsepower triplex mud pump having a 3½ inches diameter plunger and a nine inch stroke. Conventional packing assemblies comprising a forward set of V-rings, a rear set of V-rings, an intermediate lantern ring, and a preload spring were used in the first tests. A bentonite drilling fluid was pumped by this pump operating at between 100 and 150 strokes per minute. Pump pressure ranged between 9,500 and 10,000 psi and the drilling fluid temperature was about 150° F. Details of the packing assembly employed in tests conducted with this packing arrangement are as follows (adapters not included):

Spring

| Material | Stainless Steel |
|---|---|
| Outside diameter, inches | 3¾ |
| Wire diameter, inches | .331 |
| Spring constant, pounds/in. | 142 |

Front V-Rings

| Material | Laminated duck and rubber |
|---|---|
| Number | 3 |
| Inside diameter, inches | 3½ |
| Outside diameter, inches | 4½ |

Rear V-Rings

| Material | Laminated duck and rubber |
|---|---|
| Number | 3 |
| Inside diameter, inches | 3½ |
| Outside diameter, inches | 4½ |

Lantern Ring

| Material | Aluminum bronze (A.S.T.M. (B-148,Alloy 9C) |
|---|---|
| Inside diameter, inches | 3½ |
| Outside diameter, inches | 4½ |

The parts listed above as well as adapters, e.g. spring retainers, were installed in an annular space defined by the 3½ inch plunger and a 4½ inch enlargement of a packing cartridge. The lantern ring and metal adapters were sized to fit in the annular space with allowances of between about 0.002 and 0.004 inches.

During the tests, a commercial lubricating oil was delivered to the lantern ring at a pressure of about 500 psi.

In the two tests conducted with this arrangement, the packing failed after 22 and 28 hours. Upon removal of the packing assembly, it was observed that the front packing was in good condition whereas the forward ring of the rear packing had extruded past the lantern ring.

Additional tests were performed under the same operating conditions except the packing assembly of the present invention was employed to seal the 3½ inch by 4½ inch annular space. Details of the packing assembly were as follows (numerals are with reference to FIG. 1):

Spring (21)

| Material | Stainless Steel |
|---|---|
| Outside diameter, inches | 3¾ |
| Wire diameter, inches | .331 |
| Spring constant, pounds/in. | 142 |

Front V-Rings (17)

| Material | Laminated duck and rubber |
|---|---|
| Number | 3 |
| Inside diameter, inches | 3½ |
| Outside diameter, inches | 4½ |

-Continued

Rear V-Rings (18):

| | |
|---|---|
| Material | Laminated duck and rubber |
| Number | 2 |
| Inside diameter, inches | 3½ |
| Outside diameter, inches | 4½ |

Lantern Ring (19)

| | |
|---|---|
| Material | Aluminum bronze (A.S.T.M. (B-148,Alloy 9C) |
| Inside diameter, inches | 3½ |
| Outside diameter, inches | 4½ |

Backup Ring (20)

| | |
|---|---|
| Type | V-ring (laminated duck and rubber) |
| Inside diameter, inches | 3½ |
| Outside diameter, inches | 4½ |

Adapter (23)

| | |
|---|---|
| Type | Male-to-male |
| Material | Aluminum bronze (A.S.T.M. B-148 Alloy 9C) |
| Inside diameter, inches | 3½ |
| Outside diameter, inches | 4½ |

The two tests conducted with this type of packing were operated through 47 hours and 54 hours before failure.

It is important to note in the above tests that the only significant difference between the conventional packing which failed after 22 and 28 hours and the packing of the present invention which failed after 47 and 54 hours was the presence of the anti-extrusion provisions in the latter packing. The above tests demonstrate that by preventing the forward extrusion of the rear packing, the effective life of the packing assembly can be substantially increased.

Figure 2:
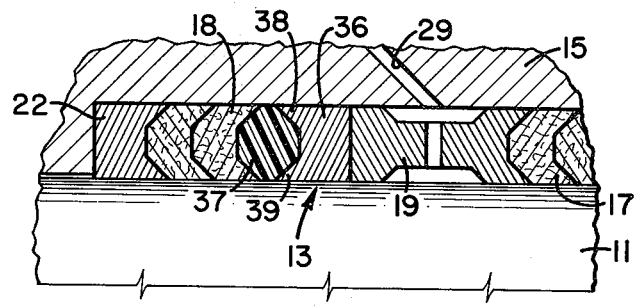
FIG. 2 and FIG. 3 illustrate other embodiments of the packing assembly in accordance with the present invention.
Figure 3:
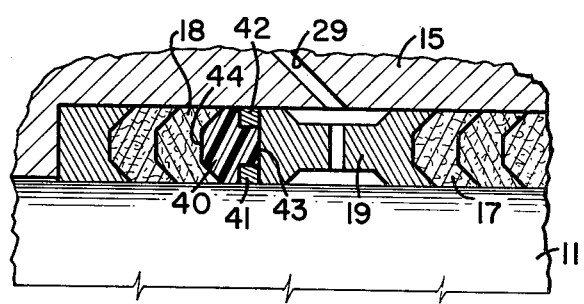

FIGS. 2 and 3 illustrate other embodiments of the present invention wherein the packing assembly is provided with different forms of anti-extrusion means at the rear edge of the lantern 19. In FIG. 2, the packing assembly 13 is similar to that illustrated in FIG. 1 comprising forward packing rings 17, rear packing rings 18, a lantern ring 19, and associated adapters. In this embodiment however the anti-extrusion means is provided by a female adapter ring 36 and a reversible male adapter 37. The adapter 37, preferably, is composed of a plastic material such as a fluoroplastic, e.g. Teflon. The female adapter 36 has a forward surface which mates with a complementary rear edge surface of lantern ring 19. Rearwardly extending lip portions 38 and 39 formed in the adapter 36 provide the metal-to-metal contact on the confining surfaces defining annular space 14. Thus under loaded conditions the plastic adapter 37 behaves much in the manner of a viscoelastic fluid forcing the lip portions 38 and 39 outwardly into contact with the confining surfaces.

A packing assembly which is particularly useful in rotary operations is illustrated in FIG. 3. This assembly is similar to those illustrated in FIGS. 1 and 2 except for the anti-extrusion means. In this embodiment, a plastic ring 40 serves as the backup ring and adapter. A pair of concentric soft metal rings 41 and 42 provide metal-to-metal contacts which close the clearance gaps between the rear edge of the lantern ring 19 and the confining surfaces. The plastic ring 40 is preferably a fluoroplastic, e.g., Teflon and has a flat forward surface 43 arranged in abutting engagement with a flat rear edge of the lantern ring. Its rear surface 44 is in the form of a male adapter for engaging the adjacent seal ring 18.

The anti-extrusion rings 41 and 42 are of a soft metal such as a copper alloy or bronze alloy. These rings are adapted to fit in complementary shaped edge grooves formed in the plastic ring 40. The inner, axially extending wall of ring 42 and its rear radial annular surface are in contact with the plastic ring 40. Similarly the outer axially extending wall and rear radial annular surface of ring 42 are in contact with the plastic ring 40. The inner wall of ring 41 engages plunger 11 and the outer wall of ring 42 engages the interior of cartridge 15. Under load conditions, the plastic ring 40 deforms as a viscoelastic fluid forcing the anti-extrusion rings 41 and 42 forwardly and radially apart providing metal-to-metal seals which close clearance gaps between the lantern ring 19 and the confining surfaces.

Summarizing, the present invention provides an improved packing assembly designed to prevent the forward extrusion of rear pack. As reflected by the foregoing description of the preferred embodiments, the anti-extrusion means incorporated in the packing assembly may take a variety of forms and configurations.

We claim:

1. A packing assembly in a plunger pump for sealing the annular space between plunger and pump body which comprises:

a first packing mounted in a forward interval of said annular space;

a second packing mounted in a rear interval of said annular space;

a lubricating ring mounted in said annular space between said packings, said first and second packing and said lubricating ring being subject to hydraulic pumping pressure; and means for preventing the forward extrusion of said second packing past said lubricating ring, said means including lip members extending rearwardly from said lubricating ring for sealing the clearance gaps between said lubricating ring and the pump body and between the lubricating ring and plunger.

2. A packing assembly as defined in claim 1 wherein said first and second packings include a plurality of lip-type seal rings, each of said lip-type seal rings being positioned within said annular space with its seal lips extending forwardly therein; and wherein said means for preventing the extrusion of said second packing further includes a lip-type seal ring positioned in mated relation with said rearwardly extending members.

3. A packing assembly as defined in claim 2 wherein said lip-type seal rings are V-rings.

4. A packing assembly as defined in claim 1 wherein said means for preventing the extrusion of said second packing includes a ring of deformable material arranged in mated relation with said rearwardly extending members to cause said members to deflect outwardly into contact with said cylindrical surfaces under hydraulic loading.

5. A packing assembly as defined in claim 1 wherein said packing assembly further includes a spring positioned within said annular space for maintaining said seal rings under compression.

6. A packing assembly for sealing the annular space between a pump plunger and pump body, which comprises:

a first set of packing rings mounted in a forward section of said annular space;

a second set of packing rings mounted in a rear section of said annular space;

a lantern ring composed of material harder than said packing rings mounted in said annular space to the rear of said first set of packing rings, said packing rings and said lantern ring being subjected to hydraulic pump pressure, said lantern ring having a rearwardly opening groove formed therein which is defined in part by a pair of outwardly tapering lips, said lips being adapted to substantially seal the clearance gap between said lantern ring and said plunger and between said lantern ring and said pump body a backup ring positioned between said lantern rings and said rear set of packing rings.

7. A packing assembly as defined in claim 6 wherein said packing rings are lip-type seal rings.

8. A packing assembly in a plunger pump for sealing the annular space between the plunger and the pump body which comprises:

a front set of elastomeric lip-type seal rings mounted in said annular space;

a rear set of elastomeric lip-type seal rings mounted in said annular space;

a lantern ring mounted in said annular space between said front and rear sets of seal rings, said rings and lantern ring being subjected to hydraulic pressure; and means interposed between said lantern ring and said rear set of seal rings for preventing the forward extrusion of said rear seal rings, said means including a pair of outwardly diverging and rearwardly extending lips formed in a rear edge portion of said lantern ring, and a backup ring having a forward surface adapted to mate with the rear edge of said lantern ring.

9. A packing assembly as defined in claim 8 wherein said backup ring is an elastomeric lip-type seal ring, and wherein the assembly further comprises an adapter interposed between said backup ring and said rear set of seal rings.

* * * * *